United States Patent [19]
Wagner

[11] 3,849,830
[45] Nov. 26, 1974

[54] TEST TUBE WASHER

[76] Inventor: William J. Wagner, 238 Covina Ave., Long Beach, Calif. 90803

[22] Filed: Sept. 18, 1973

[21] Appl. No.: 398,531

[52] U.S. Cl.................. 15/302, 15/304, 134/99, 134/171
[51] Int. Cl. .................. A471 7/00, B08b 9/08
[58] Field of Search ............ 15/302, 304, 321, 322; 21/78, 79; 134/99, 171; 141/91, 92

[56] References Cited
UNITED STATES PATENTS

| | | | |
|---|---|---|---|
| 1,854,471 | 4/1932 | Hofmann | 15/304 UX |
| 2,302,078 | 11/1942 | Wadman | 15/304 X |
| 2,309,290 | 1/1943 | Aksomitas | 15/304 X |
| 2,779,358 | 1/1957 | Fechheimer | 141/92 |
| 3,751,755 | 8/1973 | Smith | 15/302 |

FOREIGN PATENTS OR APPLICATIONS

| | | | |
|---|---|---|---|
| 595,019 | 3/1934 | Germany | 21/78 |
| 1,942,201 | 7/1970 | Germany | 15/302 |

*Primary Examiner*—Daniel Blum
*Attorney, Agent, or Firm*—Fulwider, Patton, Rieber, Lee & Utecht

[57] ABSTRACT

A test tube washer adapted for insertion into a test tube for producing a laminar wash flow over selected interior surfaces of the test tube and aspirating the rinse solution into a container, including a probe assembly having an outer tubular probe conformed to be received in a test tube, a cap closing off the bottom end of the outer probe, an inner or aspiration tube connected at the bottom end to the interior surface of the cap for concentric mounting within the outer probe, an aspiration orifice formed in the cap to communicate between the outer surface thereof and the inner cavity of the aspiration tube, A handle attached to the top ends of both the outer probe and the aspiration tube, drain orifices formed in the periphery of the outer probe immediately above the cap, a first bore communicating with the outer probe and adapted to connect to a rinse solution container, a second bore communicating with the aspiration tube and adapted to connect to a vacuum pump for withdrawing the rinse solution and a first and second vent port respectively communicating with the first and second bores for selective venting thereof to the atmosphere.

8 Claims, 4 Drawing Figures

PATENTED NOV 26 1974 3,849,830
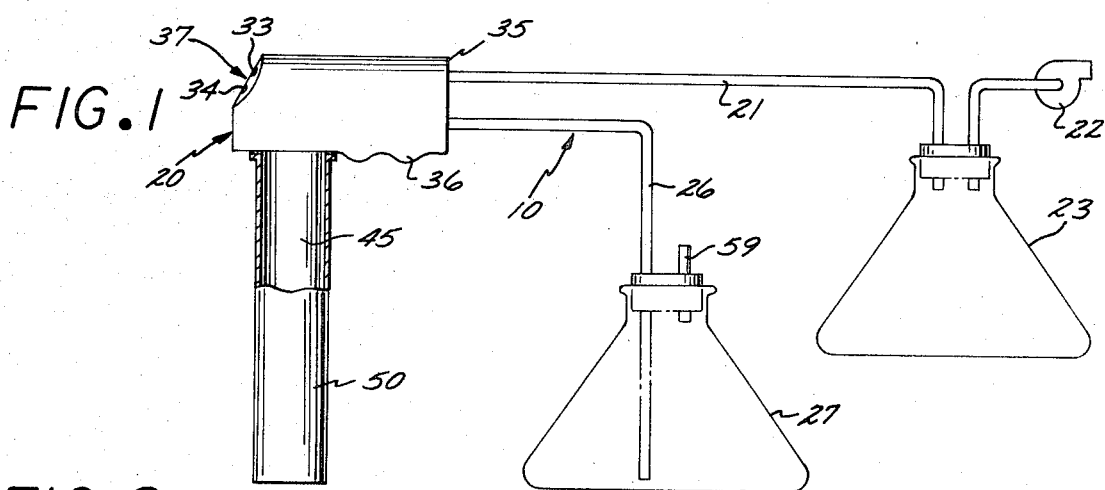
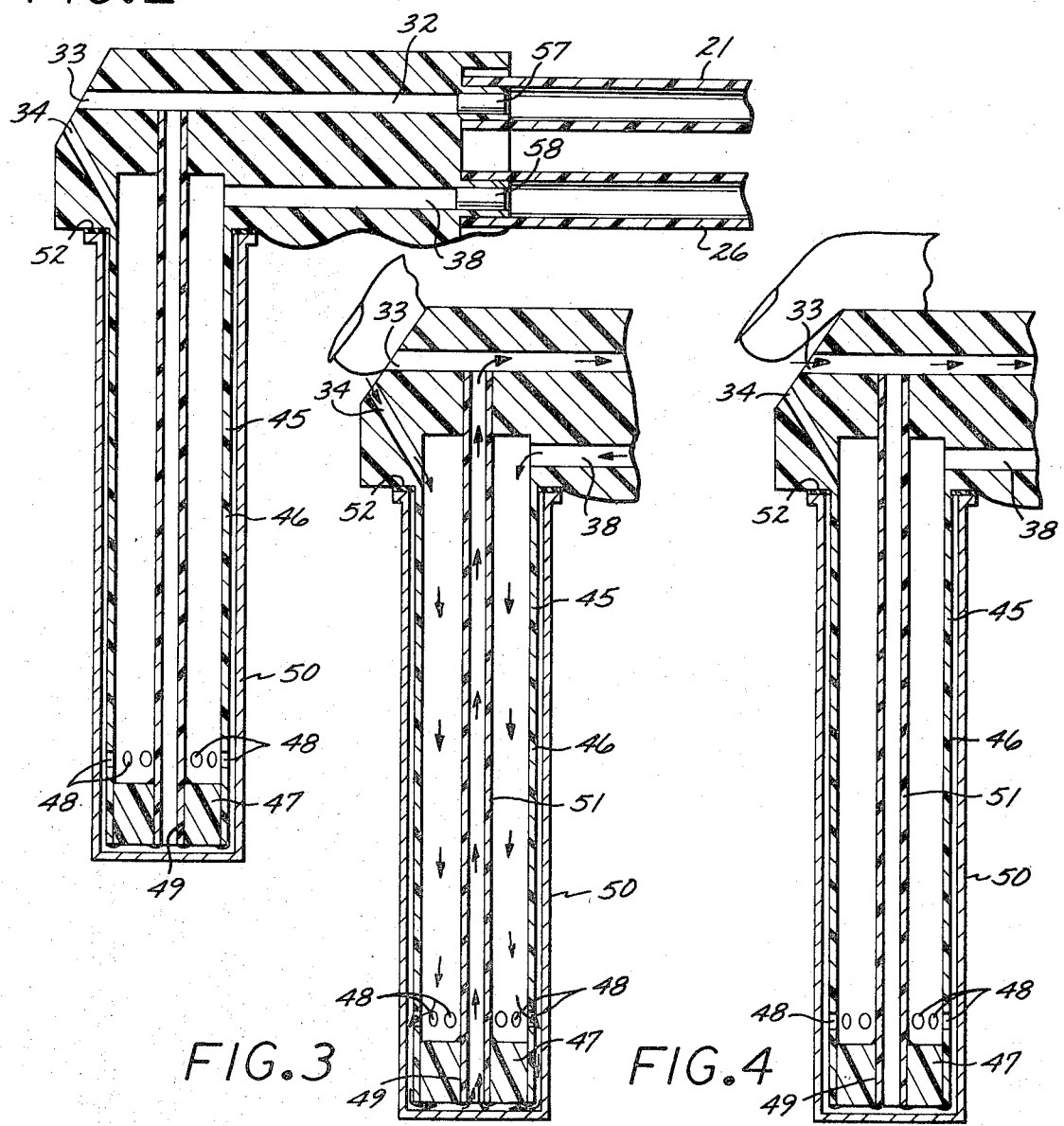

TEST TUBE WASHER

BACKGROUND OF THE INVENTION

1. Field of the Invention

The present invention relates to apparatus for washing and evacuating test tubes, and more particularly to apparatus for aspirating and rinsing a test tube having deposited on the interior surfaces thereof biological specimens.

2. Description of the Prior Art

In pathology the occasion for isolating a particular biological structure, such as an antigen, has frequent occurrence. One such application is in the assaying of Hepatitis Associated Antigen which occurs in varying count numbers in the serum of a person according to exposure to hepatitis. Typically such assaying is performed by coating an inner surface of a test tube with a Hepatitis Associated Antibody, introducing the specimen serum therein, incubating, and then washing and aspirating the residual serum to leave within the test tube the bound Antigen-Antibody structures. Following these steps the Antigen is labeled by radioactive Antibodies, the test tube is washed again and the residual radioactivity is measured to provide an indication of the amount of the Hepatitis Antigen, thus providing a positive procedure for measuring the Antigen count in any serum specimen. In such tests, the procedure of washing the test tube is critical since it is both time consuming and introduces errors to the reading, particularly if the flows associated with the wash are turbulent, and therefore randomly vary to a great degree, the possibility of not washing out labeled Antigen is great and therefore the resulting errors in reading are great. Furthermore, the prior art wash out techniques of sera which potentially carry active hepatitis do not provide for sufficient isolation of the laboratory technician from the possibility of contamination. Typically the steps of such a prior art washout procedure involve the placement of a test tube, or plurality of test tubes, below a dispenser dispensing predetermined amounts of rinse solutions after which the test tube is aspirated by vacuum to remove the rinse solution. Thus the deposition or introduction of the rinse solution as well as the aspiration can generate turbulent flows of random local intensities over the inner surfaces of the test tube by which random amounts of the sample can be washed off. The aspiration of the test tube is controlled by maintaining vacuum for a predetermined interval of time, such procedures not always resulting in a full removal of the rinse solution. The residual solution is then available for accidental spilling resulting in a hazard to the laboratory personnel both due to the possibility of radioactive isotope presence and for the possible presence of active hepatitis.

SUMMARY OF THE INVENTION

Accordingly, it is the general purpose and object of the present invention to provide an apparatus developing a laminar rinse flow over the interior surfaces of the test tube carrying the specimen, such apparatus further providing both a positive means for full aspiration of the rinse solution and manipulative convenience. Other objects of the invention are to provide test tube washing apparatus which is adaptive to various pathological procedures, such apparatus being simple, reliable and requiring few parts.

Briefly, these and other objects are accomplished within the present invention by providing the test tube washer comprising a probe assembly having an outer tubular probe conformed on the exterior surfaces for receipt within a test tube, an aspiration tube formed concentric therewith terminating in an aspiration opening formed in a bottom cap closing such tubular probe. In this manner two concentric hollow cylinders are formed where the inner cylinder or the aspiration tube terminates or is open to communicate with the interior of the test tube through the aspiration orifice formed in the bottom cap of the outer tube or the washer probe. The outer probe furthermore includes rinse orifices formed peripherally across the wall thereof immediately adjacent and above the bottom cap. The upper ends of the outer probe and the aspiration tube are received in a handle assembly through which they communicate with corresponding check valves, the inner or the aspiration tube communicating across a check valve to a vacuum waste receiving chamber while the outer or washer probe communicating across its check valve with a rinse solution reservoir. Both the inner or aspiration tube and the washer probe are furthermore provided with corresponding vent ports terminating or venting to the atmosphere at a handle surface disposed for selective covering of either or both of the ports by the finger of a lab technician. Thus as each orifice is uncovered the associated tube cavity is vented to atmosphere. In this manner, a test tube washing apparatus is provided whereby when both vent ports are closed off by a finger the rinse solution is pulled across the corresponding check valve into the interior of the washer probe, draining across the rinse orifices and along the inter space formed between the exterior surface of the washer probe and the interior surface of the test tube to assure a laminar flow thereacross, said rinse solution picking up residual parts of the specimen and being drawn into the aspiration orifice into the aspiration tube and across the corresponding check valve to the vacuum waste container. In this manner, a continuous laminar flow is produced during the wash sequence over the region of the test tube carrying the specimen and full aspiration is assured by uncovering the vent orifice associated with the washer probe and maintaining the vacuum within the aspiration orifice.

BRIEF DESCRIPTION OF THE DRAWINGS

FIG. 1 is a schematic illustration of a system associated with a test tube washer apparatus constructed according to the present invention;

FIG. 2 is a side view, in partial cross section, of a test tube washer apparatus constructed according to the present invention;

FIG. 3 is a partial side view, in cross section, of a test tube washer shown in FIG. 2 manipulated to an aspiration state; and FIG. 4 is a partial side view, in cross section, of the test tube washer shown in FIG. 3 manipulated for withdrawal.

DESCRIPTION OF THE SPECIFIC EMBODIMENT

Referring to FIG. 1, a test tube washing system, generally designated 10, includes an inventive test tube washer 20 connected by a first flexible conduit 21 to a receiving container 23 which in turn is connected to a vacuum pump 22 maintaining a negative pressure therein. Also connected between the test tube washer 20 is a second flexible conduit, or wash solution conduit, 26 terminating at the other end in a wash solution container 27. More specifically, both the first and second flexible conduits 21 and 26 attach to the back end of a transversely extending handle assembly 35 forming the top end of the test tube washer 20, such handle assembly 35 having further attached thereto the top end of a cylindrical probe assembly 45 conformed on the exterior for insertion into a test tube 50. The handle assembly 35 is further conformed on the exterior thereof to form a grasping surface 36 and venting surface 37 disposed for opposing alignment with a finger or a thumb on the top of the handle assembly 35, surface 37 including vent ports 33 and 34 formed therein which when closed in selected combinations by the finger operate, according to the teachings hereinbelow, to alternatively provide a rinse cycle, an aspiration cycle or discontinue the operation of the washer 20.

As shown in FIG. 2, the probe assembly 45 includes a tubular outer probe 46 conformed on the exterior to be received within the test tube 50 at predetermined clearances therewith, probe 46 being closed at the bottom end thereof by a circular plug or cap 47 of a predetermined thickness. Formed in the peripheral surface of probe 46 immediately above the upper disc surface of the cap 47 are a plurality of drain orifices 48 communicating between the interior and exterior of the probe 46. The cap 47, furthermore, includes a central bore or aspiration orifice 49 which receives one end of a concentric aspiration tube 51 secured in concentric alignment with probe 46. The upper ends of tube 51 and probe 46 are attached in concentric alignment to the bottom surface of the transverse handle assembly 35. In this manner the interior cavities of the tube 51 and probe 46 are closed at the upper end, respectively communicating with the first and second flexible conduits 21 and 26 across corresponding first and second manifolds 32 and 38 formed in the handle assembly 35, manifolds 32 and 38 further communicating with the respective vent ports 33 and 34. Accordingly, the interior cavity of tube 51 is connected across the manifold 32, conduit 21 and the receiving container 23 to the vacuum pump 22 drawing any liquids in the test tube 50 through the aspiration orifice 49 to be collected in the receiving container 23 when the vent port 33 is closed. A ring seal 52 surrounding the exterior or probe 46 at the interface thereof with the handle assembly 35 seals off the interior cavity of the test tube 50 when the probe assembly 45 is fully received therein to thereby provide for a vacuum draw across the drain orifices 48, the interior cavity of probe 46, manifold 38 and conduit 26 to withdraw the wash solution contained in the wash solution container 27 during such times when the ports 33 and 34 are closed. In this manner, the wash solution is conveyed from the container 27 to the receiving container 23 across the interior surfaces of the test tube 50 between the drain orifices 48 and the aspiration orifice 49, developing a laminar flow bounded by the opposing surfaces of probe 46, cap 47 and test tube 50. Upon opening of the vent port 34 the vacuum draw is interrupted and no further rinse solution is drawn into the test tube 50 while the remaining rinse solution is aspirated being replaced by atmosphere.

In order to provide a positive shut off of the rinse solution collected both in the washer 20 and container 23 and to prevent any back flow from the container 23 storing wash solution contaminated with the residue in the test tube, manifolds 32 and 38 further include corresponding check valves 57 and 58 spring biased to a closed position against the back flow to be drawn open by the vacuum draw of the pump 22. Furthermore the solution container 27 includes a vent pipe 59 communicating between the ullage and the atmosphere to allow for draining of the wash solution. To aid in maintenance and inspection, the washer 20 is constructed of transparent plastic material structure and the probe assembly 45 is radiused and deburred on all adges to assure a laminar flow condition.

In operation, the probe assembly 45 is inserted into the interior of test tube 50 to form a sealing contact at the top edge thereof. The handle assembly 35 provides a grasping surface 36 to facilitate such insertion and sealing. Upon placement of a finger to cover both ports 33 and 34, the wash solution is withdrawn from the container 27 to be collected in container 23, thus providing a laminar wash over the specimen carrying interior surfaces of the test tube. When the port 34 is opened by displacement of the finger as shown in FIG. 3, the interior cavity of probe 46 is vented to atmosphere, terminating further drawing of the wash solution into the test tube and allowing the corresponding check valve to close. In this manipulative state the residual wash solution in the test tube is drawn across the aspiration orifice 49 to the interior of tube 51 to be evacuated by the vacuum pump 22. When the test tube is thus fully evacuated the other port 33 is opened, as illustrated in FIG. 4, and the washer 20 is withdrawn.

Some of the many advantages of the present invention should now be readily apparent. The invention provides for a convenient means of washing a test tube while at the same time providing for ioslation between the lab technicians and the contents of the test tube. Furthermore, the invention provides for a convenient manipulation between the wash cycle and the drying cycle.

Obviously, many modifications and variations of the present invention may be made with regard to the foregoing detailed description without departing from the spirit of the invention.

I claim:
1. Apparatus for washing and aspirating a test tube comprising:
   external means conformed for insertion into a test tube including a first internal cavity having formed therein a drain orifice proximate the bottom end across the exterior surface thereof;
   internal means mounted in said first internal cavity including a second internal cavity connected at the bottom end thereof to an aspiration orifice formed to communicate with the exterior of the bottom end of said external means;
   handle means connected to top ends of said exterior and interior means for providing a grasping surface;
   first manifold means formed in said handle means connected to said first interior cavity at a first end thereof and including a first vent port communicating to the exterior of said handle for selective closure by any digit of a hand and adapted to connect at a second end thereof to a source of wash solution, for selectively communicating the wash solution into said first interior cavity;
   second manifold means formed in said handle means connected to said second internal cavity at a first end thereof and including a second vent port communicating to the exterior of said handle for selected closure by any digit of a hand and adapted to connect at a second end thereof to a vacuum for selectively withdrawing the wash solution received in said test tube; and sealing means disposed on said external means for affecting a seal between said test tube and said external means.

2. Apparatus according to claim 1 wherein:

said external means includes a first hollow cylinder conformed on the exterior to be received in the interior of said test tube, a cap sealably closing the bottom end of said first hollow cylinder including said aspiration orifice central therewith, said drain orifice communicating across the peripheral surface of said first hollow cylinder; and said internal means including a second hollow cylinder received within the interior cavity of said first hollow cylinder and connected at the bottom end thereof to the interior surface of said cap at said aspiration orifice.

3. Apparatus according to claim 2 wherein:

said first and second manifolds communicating by the respective first ends thereof with the interior cavities of said first and second cylinders.

4. Apparatus according to claim 1 wherein:

said external means, said internal means and said handle means are formed of a transparent material structure.

5. Apparatus according to claim 1 further comprising:

a check valve received within the second end of said second manifold and disposed to be opened by a negative pressure differential between said second manifold means and the vacuum.

6. Apparatus according to claim 2 wherein:

said handle means includes a handle attached in substantial transverse relationship to the top ends of said first and second hollow cylinders.

7. Apparatus according to claim 6 wherein:

said sealing means includes a ring seal disposed around the exterior surface of said first hollow cylinder at a dimension from the bottom end thereof conforming to the length of said test tube.

8. Apparatus according to claim 1 wherein:

said first and second vent ports are disposed in proximate relationship for simultaneously closing thereof.

* * * * *